United States Patent [19]

Tack et al.

[11] Patent Number: 4,784,542
[45] Date of Patent: Nov. 15, 1988

[54] TOOL-MOUNTING ASSEMBLY HAVING AN EXCHANGEABLE TOOL HEAD

[75] Inventors: Hans Tack, Velbert; Kurt Mayer, Essen, both of Fed. Rep. of Germany

[73] Assignee: Fried. Krupp Gesellschaft mit Beschränkter Haftung, Essen, Fed. Rep. of Germany

[21] Appl. No.: 833,183

[22] Filed: Feb. 26, 1986

[30] Foreign Application Priority Data

Mar. 1, 1985 [DE] Fed. Rep. of Germany ....... 3507225
Oct. 10, 1985 [DE] Fed. Rep. of Germany ....... 3536183

[51] Int. Cl.⁴ .................... B23C 7/00; B23B 31/40
[52] U.S. Cl. .................... 409/234; 82/36 B; 279/1 B; 408/239 R
[58] Field of Search .............. 409/231, 232, 233, 234; 408/238, 239 R; 279/102, 103, 1 B, 82; 82/36 A, 36 B, 36 R

[56] References Cited

U.S. PATENT DOCUMENTS

| | | | |
|---|---|---|---|
| 1,900,934 | 3/1933 | Hudson | 279/2 R |
| 2,051,965 | 8/1936 | Roth | 409/232 X |
| 3,658,352 | 4/1972 | Koch et al. | 279/1 B |
| 3,859,699 | 1/1975 | Lindskog | 407/109 |
| 3,999,769 | 12/1976 | Bayer et al. | 279/1 B |
| 4,135,418 | 1/1979 | McCray et al. | |
| 4,197,771 | 4/1980 | Heaton et al. | 82/36 B |
| 4,228,705 | 10/1980 | Heisner | 82/36 R |
| 4,292,866 | 10/1981 | Kaczynski | 82/36 R |
| 4,350,463 | 9/1982 | Friedline | 409/234 |
| 4,406,195 | 9/1983 | Krüger et al. | 82/36 B |
| 4,573,824 | 3/1986 | Ehle | 279/67 |
| 4,575,292 | 3/1986 | Pape et al. | 409/234 |
| 4,575,293 | 3/1986 | Berti | 409/234 |

FOREIGN PATENT DOCUMENTS

| | | | |
|---|---|---|---|
| 26751 | 4/1981 | European Pat. Off. | 409/233 |
| 0101917 | 3/1984 | European Pat. Off. | 409/233 |
| 1004889 | 3/1957 | Fed. Rep. of Germany | 279/103 |
| 3416215 | 11/1985 | Fed. Rep. of Germany | 409/231 |
| 226810 | 9/1985 | German Democratic Rep. | 409/232 |
| 224226 | 12/1984 | Japan | 409/232 |
| 139 | 2/1980 | PCT Int'l Appl. | 409/234 |
| 500920 | 1/1976 | U.S.S.R. | |
| 1113218 | 9/1984 | U.S.S.R. | 409/234 |
| 1301580 | 12/1972 | United Kingdom | |
| 1399429 | 7/1975 | United Kingdom | |
| 1456611 | 11/1976 | United Kingdom | |
| 2154479 | 9/1985 | United Kingdom | 409/233 |
| 2154481 | 9/1985 | United Kingdom | 409/232 |

*Primary Examiner*—William R. Briggs
*Attorney, Agent, or Firm*—Spencer & Frank

[57] ABSTRACT

A tool-mounting assembly includes a tool head having a receiving bore and a basic tool holder having a receiving pin that is shaped for insertion into the bore. The bore has a groove with a sloping surface and the receiving pin includes movably mounted clamping elements having lugs. The assembly also includes a clamping device in the form of a screw with left-handed threads that engage one clamping element and right-handed threads that engage the other, so that the clamping elements can be moved away from each other to force the lugs into the groove and thereby clamp the tool head to the basic tool holder. In another embodiment an axially movable push rod is used as the clamping device to force the clamping elements away from each other.

27 Claims, 7 Drawing Sheets

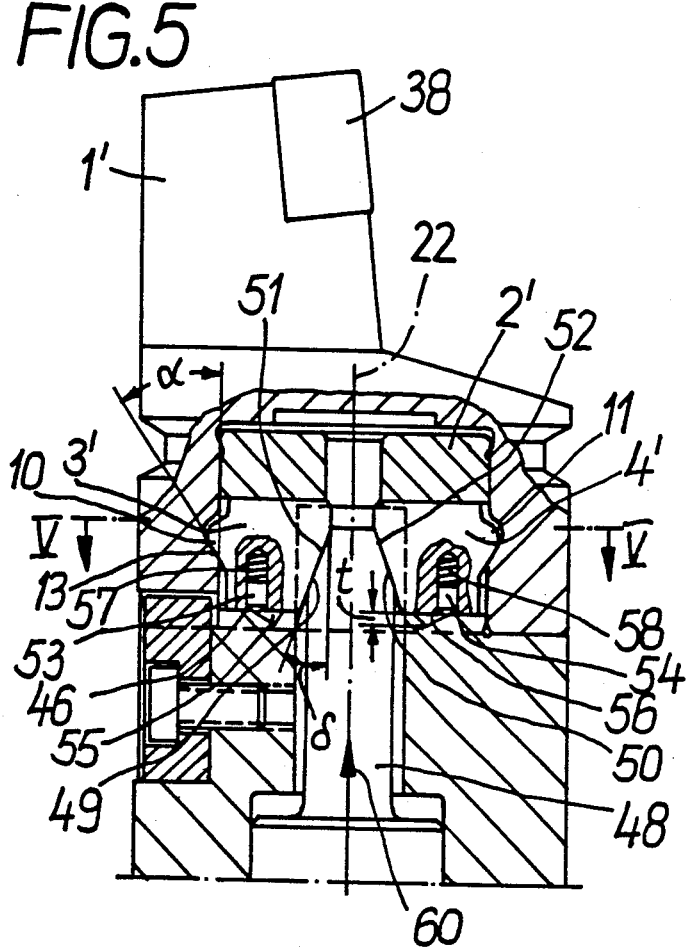
FIG.5
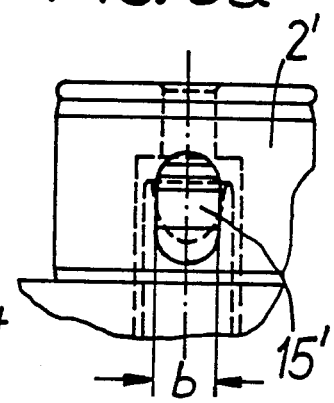
FIG.6a
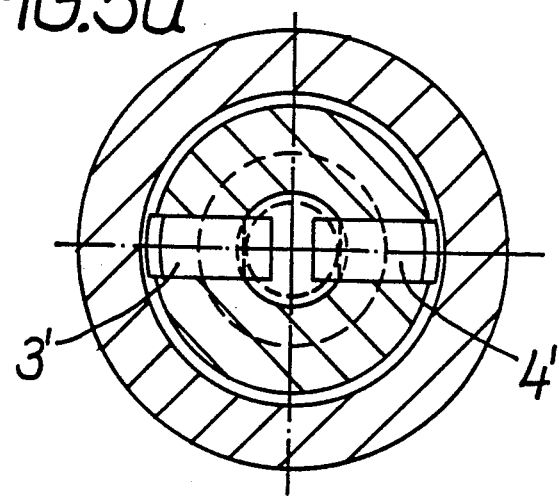
FIG.5a
FIG.6b

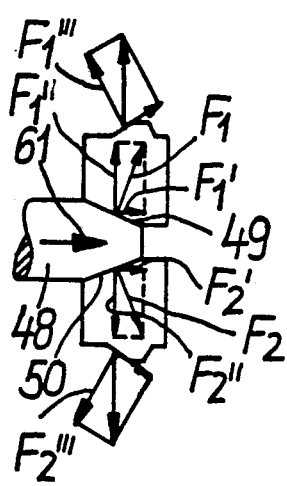
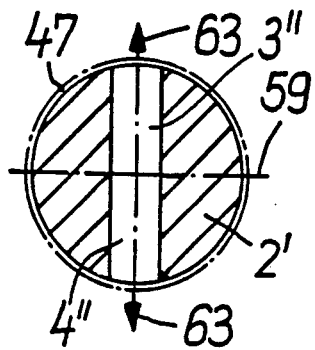
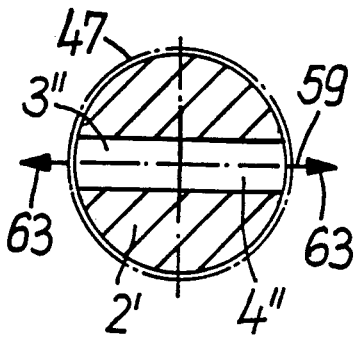
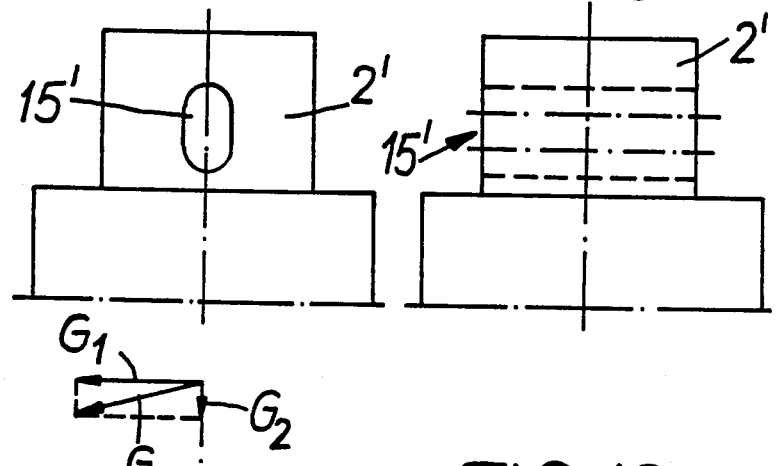
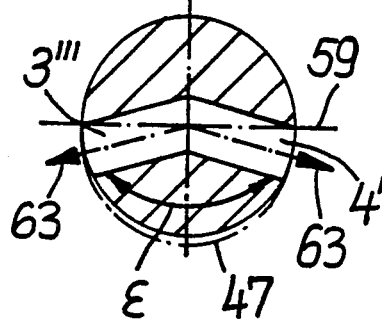
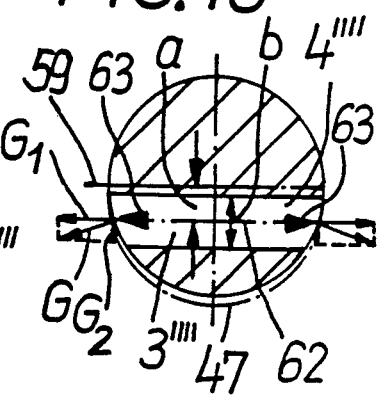

TOOL-MOUNTING ASSEMBLY HAVING AN EXCHANGEABLE TOOL HEAD

BACKGROUND OF THE INVENTION

The present invention relates to a tool-mounting assembly which is composed of a basic tool holder equipped with a receiving pin and a tool head having a receiving bore corresponding to the receiving pin. The basic tool holder and the tool head are secured to each other by means of clamping elements. The clamping elements are actuated externally by means of a clamping screw so as to hold them in a position in which planar frontal faces which extend perpendicularly to a shaft axis and which surround the receiving pin of the basic tool holder as well as the receiving bore of the tool head lie against one another without play. Such tool devices permit, in particular, rapid exchange of the tool head, either manually or by machine.

European Patent Application EP-A1 No. 0,101,917 discloses a tool-mounting assembly whose coupling includes a chuck which extends coaxially to a pull rod and, when in the closed position, surrounds projections on the pull rod. The tool head is pulled via the pull rod, the chuck, and a pull shaft into a form-locking connection (Hirth-type serration) at the tool shaft. Although the Hirth-type serration does provide for positioning of the tool head without play, it has the drawback that it does not provide favorable securing means against the relatively high moments generated by the machining forces. As a result of the engagement angle of the individual teeth, axial deflection forces result from stress on the tool head and may adversely influence positioning. Moreover, the toothed coupling location is very susceptible to dirt. For the above-mentioned reasons, very high pulling forces must be generated as a whole and these are transferred via a tensioning sleeve to the clamping pin screwed into the tool head, thus highly stressing these parts.

It is also known to secure the tool head by means of balls which, upon movement of a pull rod, are able to drop into correspondingly shaped recesses. However, the balls exert a pressure at points on the contact faces of the recesses. Moreover, dirt in the recesses and the necessary high tensile stresses also result in considerable drawbacks here.

SUMMARY OF THE INVENTION

It is therefore an object of the present invention to provide a tool-mounting assembly which does not have the above-mentioned drawbacks, but which instead reliably permits manual or automatic clamping of the tool heads, with the tool heads being easily attached and just as easily detached. It is thereby assured that the tool head is seated on the basic tool holder with the least possible play, with great rigidity being imparted to the tool-mounting assembly without the need for further supporting elements which, for rotating tools or for interior working processes, constitute a restriction of function.

This and other objects are attained by providing a tool-mounting assembly which includes a tool head having a receiving bore and a basic tool holder having a receiving pin which can be inserted into the bore, the basic tool holder additionally having a clamping device which selectively clamps the tool head to the tool holder when the pin is inserted into the bore. The receiving pin has a longitudinal center axis and includes two or more clamping elements which are movable in directions that are generally radial with respect to the longitudinal center axis. These clamping elements are equipped with clamping lugs which engage in a correspondingly configured groove in the bore of the tool head. The groove as well as the clamping lugs are provided with slide faces which are arranged at an acute angle with respect to the longitudinal center axis of the receiving pin. The clamping device selectively forces the clamping elements away from the longitudinal center axis so that the slide faces of the clamping lugs engage the slide face of the groove.

These features assure reliable guidance of the clamping elements. Moreover, the amount of force required for clamping is relatively low as a result of the correspondingly sloping slide faces of the clamping lugs and of the groove. It must be pointed out with particular emphasis that canting of the clamping elements in the basic tool holder is impossible.

According to another feature of the invention, it is possible to use, in addition to the customarily employed cylindrical receiving pins, those receiving pins which have a conical configuration at least over part of their lateral outer surfaces or jacket faces. This conical configuration permits seating without play as well as easy insertion of the tool head. Preferably, the conical configuration is selected such that the wedge angle formed by the jacket with the longitudinal center axis of a conically configured receiving pin is 1° to 10°, preferably 1.5° to 4°.

Preferably, the wedge angle between the longitudinal center axis of the receiving pin and the slide face of the groove (and the parallel, mutually opposite slide faces of the clamping lugs) is 30° to 80°, preferably 30° to 60°.

Regardless of whether the receiving pin is conical or cylindrical, the clamping device may include a clamping screw having left- and right-handed threads, in which case two clamping elements are guided in opposite directions and perpendicularly to the longitudinal center axis of the receiving pin. If the receiving pin is cylindrical, the clamping device may include a push rod having clamping faces which are arranged in the form of a wedge and which are disposed adjacent additional slide faces on the clamping movement of the push rod in the direction toward the tool head causes the clamping elements to move radially apart.

In order to facilitate, or even permit at all, release of the receiving pin from the correspondingly shaped receiving bore, if the receiving pin has a conical shape, a further feature of the invention provides that the clamping elements are equipped, at their sides facing the tool head, with conically widening slide surfaces. These slide surfaces support a pusher element, which is preferably cylindrical and which is arranged to be concentric with respect to the longitudinal center axis of the receiving pin so that it is slidably guided in the receiving pin. The side of the pusher element facing away from the slide surfaces of the clamping elements has an end which is directed toward the end of the receiving bore in the tool head.

The position of the tool head is determined, on one hand, by planar frontal faces which are pressed together and, on the other hand, by the receiving pin in conjunction with the receiving bore. To assure a perfect seat of the tool head on the basic tool holder when the pin and bore have conical portions, the dimensions of the receiving pin are selected to be slightly larger than those of the receiving bore so that, when the frontal faces of the tool head and tool holder are clamped together, the receiving pin and the receiving bore are pressed against one another. To permit clamping without damage, a surface hardened material, e.g., refined steel that has been surface hardened by nitration or case hardening, is preferably employed.

Pressing the tool head onto the receiving pin as discussed above may produce difficulties during release or change of the tool head. These difficulties are overcome by the use of the pusher element mentioned above. If the tool head is to be released, rotation of the clamping screw moves the clamping elements toward one another and this in turn moves the pusher element, which rests against the obliquely disposed slide surfaces of the clamping elements, so that the frontal end of the pusher element is pressed against the end of the receiving bore in the tool head to force the tool head away from the receiving pin. In particular, the features of the tool-mounting assembly of the present invention permit easy placement and easy removal of the tool head without having to relinquish a seat without play in the clamped-in state. It has been found to be particularly advantageous if the above-mentioned slide surfaces of the clamping elements are arranged in such a manner that they enclose an angle of 45° to 80° with the longitudinal center axis of the receiving pin.

According to a further feature of the invention, the pusher element is provided with a central bore which permits coolant to flow.

For a cylindrical receiving pin the problem of jamming of the tool head on the receiving pin generally does not occur, so the pusher element can be replaced by a securing element. The securing element is also provided with a coolant flow bore.

As has already been mentioned, the clamping screw is provided with a dual thread. Both parts are connected together via a cylindrical shaft, with the threads winding in opposite directions in both parts. The shaft of the screw is guided in correspondingly shaped receiving bores in the clamping elements. This permits rotation of the clamping screw substantially free of bending moments.

The clamping screw and the clamping elements themselves rest in a guide passage disposed in the basic tool holder, which is provided with slide support faces for the clamping elements. These slide support faces are disposed on the side facing the tool head perpendicularly to the longitudinal center axis of the receiving pin.

According to another feature of the invention, it is also possible to design the clamping elements and correspondingly shaped guide passage to have a cross section, perpendicularly to their longitudinal center axis, which is oval or circular. This configuration permits a reduction in the size of the cross section of the guide passage and of the clamping elements. Additionally, bores and clamping elements which have an oval or circular cross section are easier to manufacture.

If the receiving pin is cylindrical, the tool head can be clamped to the receiving pin in a simple manner with minimized friction losses by automatically or manually moving a push rod having wedge-shaped clamping faces. The wedgeshaped clamping faces are moved in the direction of the tool head until they come into contact with the corresponding additional slide faces in the clamping elements, and further movement in the same direction presses the clamping elements radially apart until the clamping lugs lie in the annular groove of the tool head. The ideal dimensions by which the additional slide faces and the clamping faces are inclined with respect to the longitudinal center axis has been found to be an angle between 15° and 45° (preferably between 20° and 30°). With angles in the range, neither does the path to be traversed for clamping by the push rod become too long nor are the friction forces too high between the clamping faces of the push rod and the additional slide faces of the clamping elements.

According to another feature of the invention, the clamping elements can be releasably retained in a position to receive a new tool head, when the receiving pin is exposed, by equipping the clamping elements with securing pins having ends which, when the tool head is removed from the basic tool holder and the clamping elements are thus moved toward one another, drop into recesses in the receiving pin.

Preferably this movement of the securing pins is supported by spring force. The ends of the securing pins can be automatically pushed out of the recesses, against the spring force, by providing each recess with a bottom face which extends at an oblique angle with respect to the longitudinal center axis, the bottom face having a depth which increases toward the longitudinal center axis. If the tool head is removed from the receiving pin with the push rod retracted, the clamping elements move toward one another until the securing pins engage fully in the deepest point of the recesses; the clamping elements thus are releasably fixed. The above embodiment can preferably also be realized with three clamping elements.

According to another feature of the invention, if there are two clamping elements, these clamping elements not only can be mounted for movement in mutually opposite directions, but they can also be disposed for movement at a certain angle to one another.

According to a further feature, it is also possible for oppositely movable clamping elements to be offset from the center of the axis, i.e. asymmetrical. In this way the fitting play, if the receiving bore is cylindrical, is displaced in an offset manner, thus avoiding "seating" of the tool head beyond the fitting play. If, for example, the clamping elements are placed at an angle to one another, i.e. at an angle of ≦180°, movement of the clamping elements generates a radial force component which causes the tool head to rest on the outer surface or jacket face of the receiving pin. The same effect can also be realized by displacing oppositely operating clamping pins out of the center of the axis. In this case, the elimination of play can be realized, in dependence on the tolerance play of the tool-mounting assembly, by small angular amounts or by slight axial displacement, respectively. However, generally a greater radial force will be preferred to better guide the tool-mounting assembly, so that preferably the angle between the longitudinal axes of the clamping elements should lie between 140° and 170° and the displacement from the center of the axis should be more than one-half the width of the clamping element. The width of the clamping element is here understood to mean its expanse perpendicularly to the longitudinal center axis of the clamping element.

Moreover, the tool-mounting assembly is preferably equipped with a driver/clamping structure which is combined into one unit. In the simplest case, this can be accomplished by providing the clamping elements with tangs which engage in correspondingly shaped grooves in the basic tool holder.

As a whole, the present invention thus produces almost momentum-free attachment of the tool holder, and tilting of the clamping elements in the receiving pin or canting of the tool prevented.

BRIEF DESCRIPTION OF THE DRAWINGS

FIG. 1b is a sectional view of the first embodiment perpendicular to the view shown in FIG. 1a.

FIG. 5 is a sectional view of a second embodiment of the tool-mounting assembly of the present invention, and generally illustrates a tool holder having a cylindrical receiving pin in which the clamping elements are actuated by a push rod.

FIG. 5a is a complete sectional view, taken along planes parallel to line V—V of FIG. 5, schematically illustrating portions of the second embodiment.

FIGS. 6a and 6b are side views of a receiving pin having oval and a round guide passage, respectively, for the clamping elements.

FIG. 7 is a schematic representation of the force transmission from the push rod of the second embodiment via the clamping elements to the slide surface of the groove in the bore of the tool head.

FIGS. 8a and 8b are partial cross-sectional views taken along a line perpendicular to the longitudinal center axis of the receiving pin.

FIGS. 8c and 8d are schematic longitudinal sectional view of the receiving pin.

FIG. 9 is a cross-sectional view of a receiving pin equipped with two clamping elements arranged at an angle to one another.

FIG. 10 is a cross-sectional view of a receiving pin equipped with two clamping elements offset with respect to the center of the axis of movement.

DESCRIPTION OF THE PREFERRED EMBODIMENT

Figure 1A:
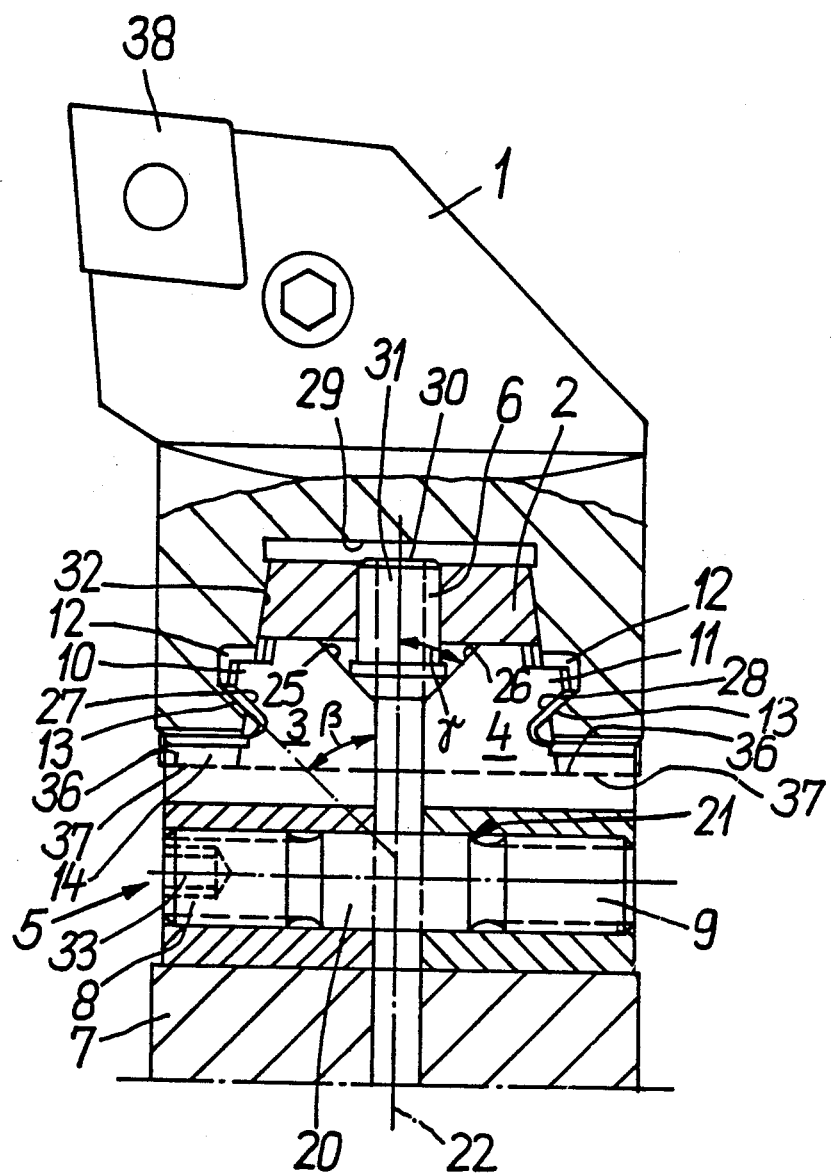
FIG. 1a is a sectional view of a first embodiment of the tool-mounting assembly of the present invention, the section being taken at a plane containing the longitudinal center axis of the receiving pin, and generally illustrates the tool head clamped to the basic tool holder.
Figure 1B:
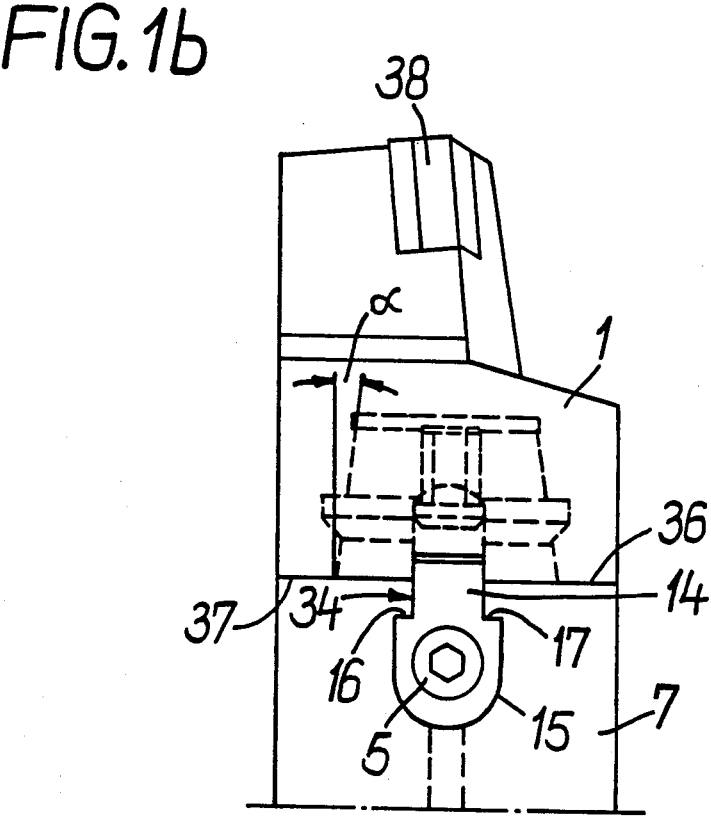
Figure 1C:
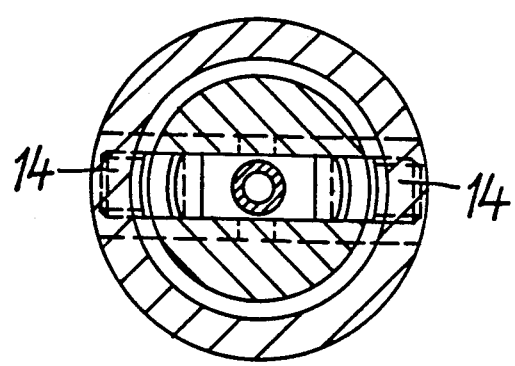
FIG. 1c is a composite sectional view, taken at several planes which are perpendicular to the longitudinal center axis of the receiving pin, schematically illustrating portions of the first embodiment.

In the embodiment of FIGS. 1a through 1d, a tool head 1 is provided with a receiving (taper) bore 65 having a frustoconically shaped surface or jacket face into which a groove 12 has been cut so as to produce a sloping portion, i.e. sloping slide face 13. The frustoconical bore 65 of the tool head is placed onto a correspondingly frustoconical receiving pin 2 of basic tool holder 7 so that the planar frontal faces 37 which surround receiving pin 2 of basic tool holder 7 and the planar frontal faces 36 which surround the receiving bore 65 of tool holder 1 and extend perpendicularly to the axis 66 of the bore lie against one another without play. Receiving pin 2 includes clamping elements 3 and 4. Clamping elements 3 and 4 are arranged, by means of a clamping device in the form of a clamping screw 5 in engagement with clamping elements 3 and 4, in recesses 15 of basic tool holder 7, which is also equipped with lateral guides 23 and 24 (see FIG. 4a) and stepped slide support faces 16 and 17 so as to prevent displacement of the clamping elements 3 and 4 in the direction of the longitudinal center axis 22 of the basic tool holder 7 and receiving pin 2. At their sides facing away from the longitudinal center axis 22 of the basic tool holder 7, clamping elements 3 and 4 are provided with lugs 10 and 11 which have sloping slide faces 27 and 28 directed away from reversible cutting plate 38 at the tip of the tool head 1 and extending in the direction of longitudinal center axis 22. Slide faces 27 and 28, in cooperation with corresponding slide face 13 in groove 12, serve as slide planes when the tool head 1 is clamped in. Clamping elements 3 and 4 are additionally provided with two tangs 14 which engage in corresponding grooves 34. This causes the torque generated by the machining action to be absorbed in the same manner as is done by supporting faces 16, 17, 18 and 19 of recess 15 (see FIG. 4a).

The clamping elements 3 and 4 are in engagement with the dual thread of clamping screw 5, with thread portions 8 and 9 exhibiting oppositely oriented pitches (that is a left-hand thread and a right-hand thread). Between these thread portions 8 and 9, clamping screw 5 is provided with a cylindrical shaft 20 which is rotatably mounted in correspondingly large receiving bores of clamping elements 3 and 4. For example, clamping screw 5 can be rotated via index bore 33 by means of a clamping tool (not illustrated) or by automatic coupling to a clamping drive (not illustrated).

Figure 1D:
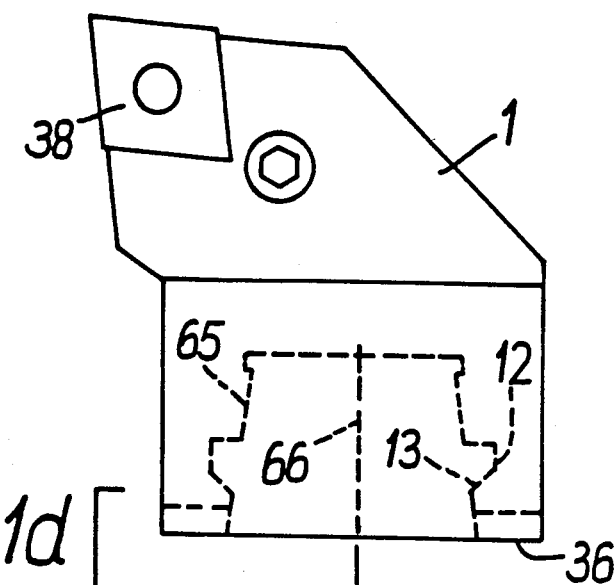
FIG. 1d is an exploded view, partially in section, generally illustrating operation of the first embodiment.

Additionally, the tool holder 7 is provided with a pusher element 6 (which is not shown in FIG. 1d). Pusher element 6 has an essentially cylindrical shape and an end 30 that projects out of the receiving pin 2. The other end of pushed element 6 rests on slide surfaces 25 and 26, which are formed by faces of clamping elements 3 and 4 that extend obliquely to the longitudinal center axis 22 of the receiving pin 2. Slide surfaces 25 and 26 form an angle ($\gamma$) of approximately 45° with the longitudinal center axis 22, with the angle becoming wider toward the tip of the tool head 1. Moreover, pusher element 6 is also provided with a central bore 31 to accommodate a coolant.

The tool-mounting assembly shown in FIGS. 1a–1d is operated as follows. Rotation of clamping screw 5 engages thread sections 8 and 9 and moves clamping elements 3 and 4 in opposite directions, i.e. for clamping in a direction leading away from longitudinal center axis 22 and for releasing in the direction toward the longitudinal center axis 22. For clamping, lugs 10 and 11 of clamping elements 3 and 4 are pushed into the corresponding groove 12 in the receiving bore 65 of the tool head, with slide faces 27 and 28 of lugs 10 and 11 being pushed over the slide face 13 of groove 12.

The result of this is that frontal face 36 of the tool head 1 is pressed against frontal face 37 of the basic tool holder 7. The tool head 1 is clamped in. When the tool head 1 is released, clamping screw 5 is turned in the opposite direction, thus moving clamping elements 3 and 4 toward longitudinal center axis 22. Because of the wedge shape of the receiving pin 2 even if wedge angle α between the direction of the longitudinal center axis 22 and jacket face 32 of receiving pin 2 is less than 10°, it may happen that tool head 1 is difficult to release from receiving pin 2. Easy release is made possible by pusher element 6, which is pressed away via slide surfaces 25 and 26 when clamping elements 3 and 4 move toward one another, so that end 30 of the pusher element 6 is pressed against end or base face 29 of the receiving bore 65 and pushes tool head 1 away from receiving pin 2.

Figure 2:
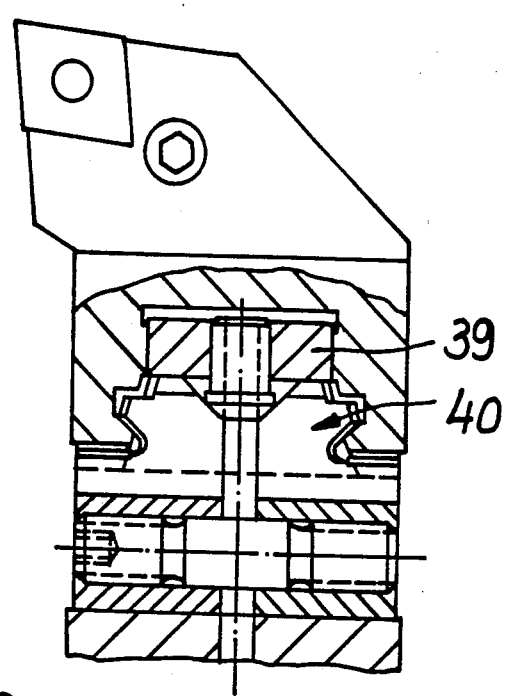
FIG. 2 is a sectional view illustrating a tool holder with an attached tool head in a modification of the first embodiment of the tool-mounting assembly.

The modification according to FIG. 2 differs from the embodiment shown in FIGS. 1a–1d by a differently shaped receiving pin and by a correspondingly adapted receiving bore in the tool head. While the receiving pin shown in FIGS. 1a–1d has a frustoconical shape, the receiving pin according to FIG. 2 is composed of a cylindrical portion 39 and a frustoconical portion 40. Due to the fact that the receiving bore is shaped correspondingly, placement of the tool head results in ideal guidance which can be utilized in particular for automatic tool changes.

Figure 3:
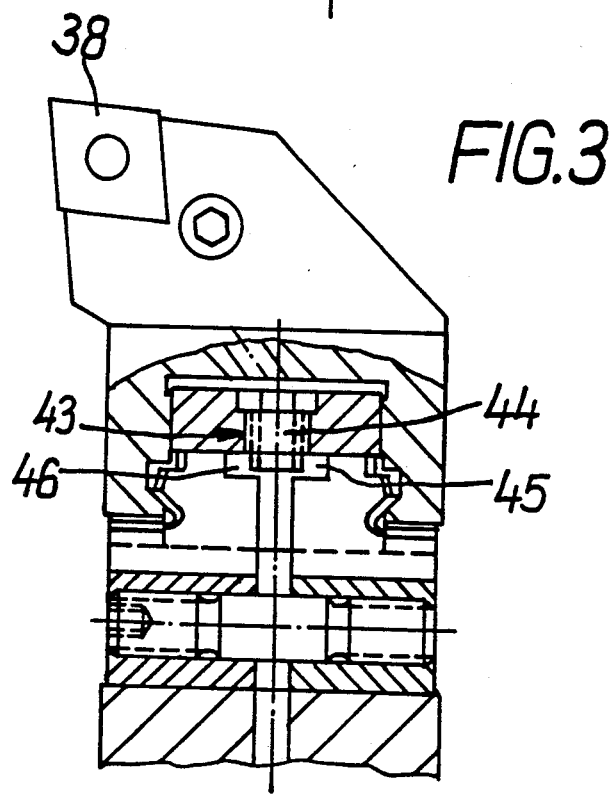
FIG. 3 is a sectional view illustrating a tool holder with an attached tool head in a further modification of the first embodiment.

FIG. 3 shows a further modification, with the basic tool holder having a cylindrical receiving pin which clamps the tool head in a correspondingly shaped cylindrical receiving bore by way of clamping elements. Since, in contrast to receiving pins having frustoconical portions, cylindrical receiving pins do not pose the problem of the tool head jamming, no pusher element is required. Consequently, only a securing element 43 is provided which has a bore 44 for the influx of coolant to the cutting edge of reversible cutting plate 38. At their sides facing reversible cutting plate 38, the clamping elements are provided with recess 45 and 46, which are adapted in shape to the lower portion of securing element 43 and permit unimpeded movement of the clamping elements without impairment by the above-mentioned securing element 43.

Figure 4A:
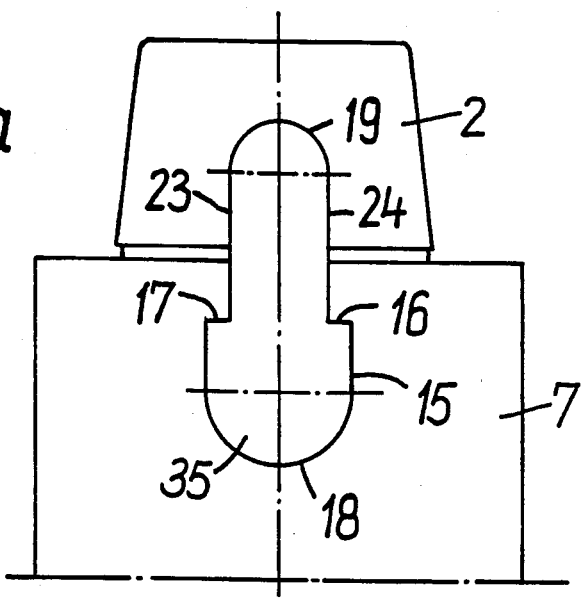
FIGS. 4a to 4f are sectional schematic views illustrating various configurations of a passage for accommodating the clamping elements and their tangs.

FIGS. 4a–4f show various configurations of the guide passages, recesses 15, for the clamping elements. The essential features will be described with reference to FIG. 4a (it being noted that FIG. 4a is presented in very schematic form, without various features of the receiving pin such as lugs 10 and 11). The guide passage generally has stepped slide faces 16 and 17, which prevent displacement of the clamping elements in the direction toward the tip of the tool head. To minimize torques, lateral guide faces 23 and 24 and supporting faces 18 (in the lower portion of the guide passage) and 19 (in the upper portion of the guide passage) are provided. Clamping screw 5 (not illustrated in FIG. 4a) is positioned in recess 35 as part of recess 15.

Figure 4B:
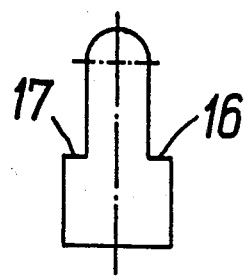
Figure 4C:
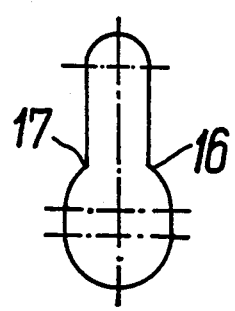
Figure 4D:
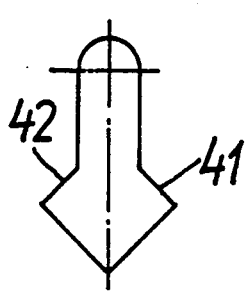
Figure 4E:
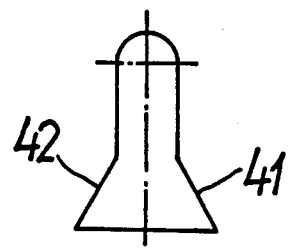
Figure 4F:
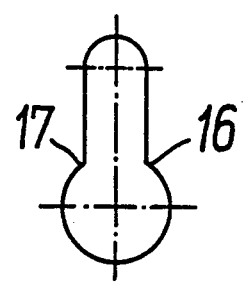

The guide passages according to FIGS. 4b, 4c and 4f have a similar configuration, i.e. a long, rounded shape with supporting faces 16 and 17 providing distinct steps (FIG. 4b) or corresponding configurations (FIGS. 4c and 4f). The portion of the guide passage accommodating the clamping screw 5 may also have an essentially triangular or square lower portion, as shown in FIGS. 4d and 4e, with the function of stepped faces 16 and 17 being performed by side faces 41 and 42, which prevent displacement of the clamping elements in the direction toward the tip of the tool head.

The embodiment of the tool-mounting assembly shown in FIG. 5 likewise has a cylindrical receiving bore into which a cylindrical receiving pin 2' can be inserted. A push rod 48 serves as the clamping device and is provided, at its end facing clamping elements 3' and 4' of receiving pin 2', with a wedge-shaped surface or jacket face produced by cutting a cylinder as illustrated in FIG. 7, so that clamping faces 49 and 50 of push rod 48 come to lie at additional slide faces 51 and 52 of clamping elements 3' and 4' which are arranged at a corresponding angle. Additional slide faces 51 and 52, as well as clamping faces 49 and 50, are disposed at an angle δ of between 15° and 45° with respect to longitudinal center axis 22, in the present case at 20°. When selecting the angle δ, it will be necessary to consider in each case that a smaller angle requires a longer path of the push rod 48 to bring clamping elements 3' and 4' into their locked position.

Figure 5B:
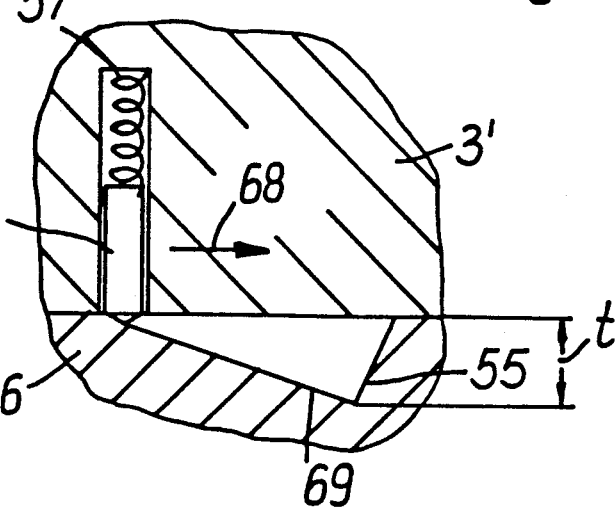
FIG. 5b is a sectional view illustrating a feature of FIG. 5 in more detail.

In contradistinction to the arrangement shown in FIGS. 1 to 3, the clamping elements 3' and 4' are additionally provided with securing pins 53 and 54 which are biased by springs 57 and 58. Structurally, the securing pins 53 and 54 are arranged in such a manner that they lie in bores provided on the sides of the clamping elements 3' and 4' facing away from the tool head 1' (this is illustrated in enlarged scale in FIG. 5b for the securing pin 53 of clamping element 3'). Springs 57 and 58, respectively, are fastened at the closed ends of the bores; securing pins 53 and 54 are attached to springs 57 and 58. While the securing pins 53 and 54 abut at a frontal wall 46 of the receiving pin directly opposite the bore when the tool head lies clamped in, i.e. when the clamping elements 3' and 4' are as far apart as possible, the outer ends of securing pins 53 and 54 are able to drop, with the support of the pressure of springs 57 and 58, into recesses 55 and 56 when the tool head 1 is released, which coincides with movement of clamping elements 3' and 4' toward one another, and this engagement causes clamping elements 3' and 4' to be releasably fixed. In FIG. 5b, for example, it will be apparent that the lower end of pin 53 is poised to fall into its recess 55 when the withdrawal of push rod 48 and subsequent removal of tool head 1' cause clamping element 3' to move, in the direction of arrow 68, toward the longitudinal center axis 22. Recesses 55 and 56 are shaped so that their depths increase toward longitudinal center axis 22, with the bottom faces 69 of the recesses extending at an oblique angle with respect to the longitudinal center axis 22 until a depth t is attained. In this way, it is assured that, the next time the tool head 1' is clamped in, the securing pins can be pushed out of recesses 55 and 56 against the pressure of the springs without further external action other than that of push rod 48 to move clamping elements 3' and 4' away from one another.

The tool-mounting assembly shown in FIGS. 5, 5a, and 5b operates as follows. Moving push rod 48 in the direction of arrow 60 causes clamping faces 49 and 50 of push rod 48 to lie at additional slide faces 51 and 52 of clamping elements 3' and 4'. Further movement of rod 48 in the direction of the arrow 60 causes lugs 10 and 11 of the clamping elements 3' and 4' to finally come to lie in the correspondingly shaped groove 12 in the receiving bore of tool head 1'. The slide face 13 of the groove 12, as well as the corresponding angle of the wedges of the clamping element 3' and 4', forms an angle between 30° and 60° with the longitudinal center axis 22, in the present case an angle of about 30°. The tool head 1' is clamped in.

When push rod 48 is pulled back, the locking action provided by clamping elements 3' and 4' is released again so that, due to the effect of slide faces 27 and 28, clamping elements 3' and 4' are pushed toward one another along slide face 13 of groove 12 when tool head 1' is removed. At the same time, the pressure of springs 57 and 58 presses the outer ends of securing pins 53 and 54 into recesses 55 and 56 until they come to rest at the point of maximum depth t.

FIGS. 6a and 6b (which are schematic in nature, and do not illustrate features such as the lugs on receiving pin 2') show oval (oblong) and circular recesses 15', respectively, for the clamping elements. If the clamping elements 3' and 4' to be guided through are likewise selected to have portions with segments that are oval or circular in cross section, the smaller area to be drilled open permits a substantially more stable design for the basic tool holder in the region of the receiving pin 2'. Moreover, oblong and round passages are much easier to manufacture. Passages 15' and the correspondingly adapted clamping elements have a width b.

FIG. 7 shows how the forces introduced by push rod 48 are distributed. If the push rod is moved in the direction of arrow 61, the forces $F_1$ and $F_2$, respectively, exerted via its clamping faces 49 and 50 are divided, according to the parallelogram of forces, into force components $F_1'$ and $F_2'$, respectively, acting in the direction of movement as well as force components $F_1''$ and $F_2''$ acting perpendicularly to the direction of movement. Forces $F_1''$ and $F_2''$, respectively, act via slide faces 27 and 28 of clamping lugs 10 and 11 on slope 13 of groove 12 so that forces $F_1'''$ and $F_2'''$, respectively, result between the mentioned faces. These forces $F_1'''$ and $F_2'''$ also act in the direction opposite to arrow 61 so that the tool head is pressed against frontal face 37 of the basic tool holder.

FIGS. 8a and 8b are schematic cross-sectional views of clamping element arrangements perpendicularly (FIG. 8a) and parallel (FIG. 8b) to an imaginary center axis 59 in the direction of the axis of rotation of the not illustrated workpiece and extending perpendicularly to the longitudinal center axis 22. The arrows 63 indicate the direction of movement of the clamping elements 3'' and 4'' when the tool head 1' is being clamped in. The dot-dash line 47 shown on the circumference represents the play (the tolerance) of receiving pin 2' in the corresponding receiving bore of the tool head 1'. FIGS. 8c and 8d show the corresponding guide passages or recesses 15' for the clamping elements in receiving pin 2' (it being noted that these Figures are very schematic in nature, and do not illustrate various features such as the lugs on receiving pin 2').

FIG. 9 shows an angular arrangement of clamping elements 3''' and 4''' with respect to one another. The angle ε formed thereby is 160°. FIG. 9 also shows how the force G exerted by the movement of the clamping elements on the slope 13 of clamping lug 12 is divided into a force component $G_1$ acting parallel to imaginary center axis 59 and a force component $G_2$ acting perpendicularly thereto.

Such a distribution of force components can also be realized, as illustrated in FIG. 10, by arranging the clamping elements 3'''' and 4'''' so that the axis of movement 67 is not in the center, but instead is parallel to an imaginary cross-sectional axis 59. Here again, the forces are divided into components $G_1$ and $G_2$ as described above.

With an asymmetrical arrangement of two clamping elements—i.e. with the axis not in the center—the fitting play customary for cylindrical fits is shifted in an offset manner by the effect of the radial force component $G_2$. The consequence is that "seating" of the tool head beyond the fitting play should be prevented. In selecting angle ε and the distance a of the common longitudinal axis 62 of the clamping elements from the imaginary center axis 59, it should be noted that slight deviations of the angle from 180° cause elimination of the tolerance play. To reliably avoid tilting of the tool head, however, it is desirable to produce a higher radial force $G_2$ so that preferably the angle ε in FIG. 9 should be selected to be smaller than 180°. Furthermore, in FIG. 10 the displacement between axes 59 and 60 should be more than one-half the width b of the clamping elements. The latter measure also results in a surface pressure which is the desired ideal and which prevents canting or deformation of the tool.

Figure 11:
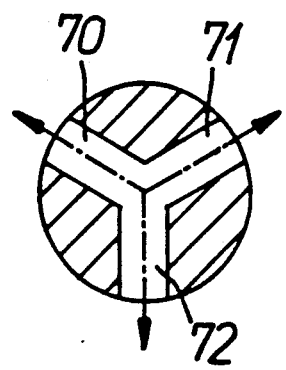
FIG. 11 is a cross-sectional view of a receiving pin equipped with three clamping elements arranged at an angle of 120° to one another.

FIG. 11 shows an assembly with three clamping elements 70, 71 and 72 arranged at an angle of 120° to one another.

It will be understood that the above description of the present invention is susceptible to various modification, changes and adaptations, and the same are intended to be comprehended within the meaning and range of equivalents of the appended claims.

What we claim is:

1. A tool-mounting assembly, comprising:
   a tool head having a receiving bore with an opening and bore axis which extends through said opening, said bore having a groove with a slide face which extends at an acute angle to said bore axis, said tool head additionally having a frontal face surrounding said opening and extending perpendicularly to said bore axis; and
   a basic tool holder having a base with a frontal face, having a receiving pin configured for insertion into said receiving bore, said receiving pin extending outward from said frontal face of said base and having a pin axis which coincides with said bore axis when said receiving pin is inserted into said receiving bore, and having externally actuated clamping device means for selectively clamping said frontal face of said tool head to said frontal face of said base when said receiving pin is inserted into said receiving bore, wherein said receiving pin includes a plurality of chucking elements having outside portions that are mounted on said base for radial movement with respect to said pin axis, each chucking element additionally having an inside portion with a slide face which is configured to enter said receiving bore and engage said slide face of said groove, said outside portions of said chucking elements being disposed on one side of said frontal face of said base and said inside portions of said chucking elements being disposed on the other side of said frontal face of said base, and wherein said clamping device means includes means for selectively forcing said chucking elements away form said pin axis to press said slide faces of said chucking elements against said slide face of said groove.

2. The assembly of claim 1, wherein said receiving pin has a lateral outer surface, at least a portion of said lateral outer surface having a conical configuration.

3. The assembly of claim 2, wherein there is a wedge (α) between said pin axis and a line which is tangent to said at least a portion of said lateral outer surface having a conical configuration, said wedge angle ($\alpha$) being in the range from 1° to 10°.

4. The assembly of claim 3, wherein said wedge angle ($\alpha$) ranges from 1.5° to 4°.

5. The assembly of claim 1, wherein there are two chucking elements, the outside portion of each having a threaded bore, and wherein said clamping device means comprises a clamping screw having a left-handed threaded region to engage the threaded bore of one chucking element and a right-hand threaded region to engage the threaded bore of the other chucking element, said clamping screw driving said chucking elements in opposite directions and perpendicular to said pin axis when said clamping screw is rotated.

6. The assembly of claim 1, wherein said slide face of said groove extends at an angle ($\beta$) with respect to said bore axis and the slide faces of said chucking elements extend at said angle ($\beta$) with respect to said pin axis, said angle ($\beta$) lying in the range of from 30° to 80°.

7. The assembly of claim 6, wherein said angle ($\beta$) ranges from 30° to 60°.

8. The assembly of claim 1, wherein said bore has an end face through which said bore axis runs, wherein said receiving pin includes a pusher element that is mounted for sliding movement along said pin axis, said pusher element having a first end and having a second end that is disposed adjacent said end face of said bore when said receiving pin is inserted into said bore, and wherein the inside portion of said chucking elements additionally have conically spreading slide surfaces which lie adjacent said first end of said pusher element.

9. The assembly of claim 8, wherein there is an angle ($\gamma$) between said slide surfaces and said bore axis, said angle ($\gamma$) lying in the range from 45° to 80°.

10. The assembly of claim 8, wherein said pusher element has a central bore to accommodate a flow of coolant.

11. The assembly of claim 1, where there are two chucking elements, the outside portion of each having a respective bore with a threaded portion and an unthreaded portion, and wherein said clamping device means comprises a clamping screw having a left-hand threaded region to engage the threaded portion of the bore of one chucking element, a right-hand threaded region to engage the threaded portion of the bore of the other chucking element, and a cylindrical shaft portion which lies between said threaded regions and which engages the unthreaded portion of the bore of each chucking element, said clamping screw driving said chucking elements in opposite directions and perpendicular to said pin axis when said clamping screw is rotated.

12. The assembly of claim 1, wherein there are two chucking elements, the outside portion of each having a respective threaded bore, wherein said base has an elongated guide passage in which the outside portions of said chucking elements are movably disposed, said guide passage having slide support faces which are oriented perpendicularly to said pin axis, and wherein said clamping device means comprises a clamping screw having a left-hand threaded region to engage the threaded bore of one chucking element and right-hand threaded region to engage the threaded bore of the other chucking element, said clamping screw driving said chucking elements in opposite directions and perpendicular to said pin axis when said clamping screw is rotated.

13. The assembly of claim 1, wherein the outside portion of at least one chucking element is movably accommodated in a corresondingly shaped guide passage in said base, said guide passage having an axis, the outside portion of said at least one chucking element and said guide passage having a cross section, in a plane perpendicular to said axis of said guide passage, with a circular segment.

14. The assembly of claim 1, wherein the outside portion of at least one chucking element is movably accommodated in a correspondingly shaped guide passage in said base, said guide passage having an axis, the outside portion of said at least one chucking element and said guide passage having a cross section, in a plane perpendicular to said axis of said guide passage, with an oval segment.

15. A tool-mounting assembly, comprising:
a tool head having a receiving bore with an opening and a bore axis which extends through said opening, said bore having a groove with a slide face which extends at an acute angle to said bore axis, said tool head additionally having at least one frontal face surrounding said opening and extending perpendicularly to said bore axis; and
a basic tool holder having a receiving pin configured for insertion into said receiving bore, said receiving pin having a pin axis which coincides with said bore axis when said receiving pin is inserted into said receiving bore, having at least one frontal face disposed around said receiving pin, and having externally actuated clamping device means for selectively clamping said at least one frontal face of said tool head to said at least one frontal face of said basic tool holder when said receiving pin is inserted into said received bore,
wherein said receiving pin includes a plurality of chucking elements that are mounted for movement that is generally radial with respect to said pin axis, each chucking element having a chuck jaw with a slide face which is configured to engage said slide face of said groove,
wherein said clamping device means includes means for selectively forcing said chucking elements away from said pin axis to press said slide faces of said clamping elements against said slide face of said groove,
wherein said chucking elements have additional slide faces that are disposed adjacent said pin axis and that are oriented obliquely with respect to said pin axis,
wherein said clamping device means comprises a movably mounted push rod having a wedge-shaped clamping faces which are positioned to engage said additional slide faces and force said chucking elements radially apart when said rod is pushed, and
wherein said receiving pin has a plurality of recesses, each recess being disposed adjacent a respective chucking element, and further comprises means for urging said chucking elements toward said pin axis when said push rod is withdrawn from said additional slide faces and said tool head is removed from said receiving pin, said means for urging including a plurality of securing pins, each pin being movably mounted in a respective chucking element and having an end which is positioned to fall into the respective recess when the respective chucking element moves toward said pin axis.

16. The assembly of claim 15, wherein said additional slide faces extend at an angle (δ) with respect to said pin axis and said clamping faces of said push rod extend at said angle (δ) with respect to said pin axis, said angle (δ) lying in the range of 15° to 45°.

17. The assembly of claim 16, wherein said angle (δ) ranges from 20° to 30°.

18. The assembly of claim 15, wherein each recess has a bottom face which extends at an oblique angle to said pin axis, with the depth of the recess increasing for at least part of the way toward said pin axis.

19. The assembly of claim 15, wherein said means for urging further comprises spring means for biasing said pins.

20. The assembly of claim 1, wherein there are two chucking elements each having a respective axis, said respective axes being disposed at an angle (ε) with respect to each other.

21. A tool-mounting assembly, comprising:
a tool head having a receiving bore with an opening and a bore axis which extends through said opening, said bore having a groove with a slide face which extends at an acute angle to said bore axis, said tool head additionally having at least one frontal face surrounding said opening and extending perpendicularly to said bore axis; and
a basic tool holder having a receiving pin configured for insertion into said receiving bore, said receiving pin having a pin axis which coincides with said bore axis when said receiving pin is inserted into said receiving bore, having at least one frontal face disposed around said receiving pin, and having externally actuated clamping device means for selectively clamping said at least one frontal face of said tool head to said at least one frontal face of said basic tool holder when said receiving pin is inserted into said receiving bore,
wherein said receiving pin includes a plurality of chucking elements that are mounted for movement that is generally radial with respect to said pin axis, each chucking element having a chuck jaw with a slide face which is configured to engage said slide face of said groove,
wherein said clamping device means includes means for selectively forcing said chucking elements away from said pin axis to press said slide faces of said clamping elements against said slide face of said groove, and
wherein said chucking elements are disposed asymmetrically with respect to a cross-sectional axis extending perpendicularly to said pin axis.

22. The assembly of claim 21, wherein there are two chucking elements that are disposed along an axis which is parallel to and spaced apart, by a predetermined distance, from said cross-sectional axis extending perpendicularly to said pin axis.

23. The assembly of claim 22, wherein said chucking elements have a predetermined thickness, and wherein said predetermined distance is greater than half of said predetermined thickness.

24. The assembly of claim 20, wherein said angle (ε) lies in the range of 170° to 140°.

25. The assembly of claim 1, wherein said chucking elements are symmetrically disposed about said pin axis and are movable along respective lines that are substantially perpendicular to said pin axis, wherein said slide faces of said chucking elements slope outwardly at an angle conforming to said angle of said slide face of said groove, and wherein said slide faces of said chucking elements slidably engage said slide face of said groove when said chucking elements are forced away from said pin axis.

26. The assembly of claim 1, wherein there are three chucking elements.

27. The assembly of claim 1, wherein said tool head has grooves and said chucking elements have correspondingly shaped tangs which engage respective grooves.

* * * * *